(12) United States Patent
Cooper

(10) Patent No.: US 7,174,771 B2
(45) Date of Patent: Feb. 13, 2007

(54) LEAK DETECTION SYSTEM

(75) Inventor: Ralph W. Cooper, Sanford, MI (US)

(73) Assignee: Michigan Aqua Tech, Sanford, MI (US)

( * ) Notice: Subject to any disclaimer, the term of this patent is extended or adjusted under 35 U.S.C. 154(b) by 0 days.

(21) Appl. No.: 10/665,921

(22) Filed: Sep. 18, 2003

(65) Prior Publication Data

US 2005/0072214 A1   Apr. 7, 2005

(51) Int. Cl.
    *G01M 3/28* (2006.01)
(52) U.S. Cl. .................................................. 73/40.5 R
(58) Field of Classification Search ............... 73/40, 73/40.5 R; 137/15.11; 340/605; 702/51
    See application file for complete search history.

(56) References Cited

U.S. PATENT DOCUMENTS

| | | | | |
|---|---|---|---|---|
| 2,659,383 | A | | 11/1953 | Frager ........................ 137/460 |
| 4,522,229 | A | | 6/1985 | Guido ......................... 137/460 |
| 4,586,142 | A | * | 4/1986 | Cota et al. ..................... 702/51 |
| 4,665,932 | A | | 5/1987 | Quenin ........................ 137/486 |
| 5,076,321 | A | | 12/1991 | Terry .......................... 137/460 |
| 5,161,563 | A | * | 11/1992 | Thompson ...................... 137/1 |
| 5,179,922 | A | * | 1/1993 | Bartholomew ......... 123/198 DB |
| 5,347,264 | A | * | 9/1994 | Bjorkman .................... 340/611 |
| 5,441,070 | A | * | 8/1995 | Thompson ...................... 137/1 |
| 5,539,384 | A | | 7/1996 | Frasier ........................ 340/605 |
| 5,636,653 | A | * | 6/1997 | Titus ........................... 137/14 |
| 5,920,265 | A | | 7/1999 | Johnson, Jr. et al. ........ 340/605 |
| 6,317,051 | B1 | * | 11/2001 | Cohen ......................... 340/603 |
| 6,339,953 | B1 | | 1/2002 | Ashworth ..................... 73/49.5 |
| 6,549,857 | B2 | | 4/2003 | Fierro et al. ................... 702/51 |

OTHER PUBLICATIONS

"Flow Meter" definition from The American Heritage Dictionary of the English Language, 3rd Edition 1992.*
Davis Inotek Instruments online listing of Paddle Type Flow Switch devices.*
Aqua Managers, Inc., Floodstop (FS ⅜-C) unit info., Home/Product page (www.aquamanagers.com) downloaded Nov 27, 2006.
Davis inotek (R) Instruments, PSR Series Paddle Type Flow Switch info., copyright 2004, downloaded sub-sequently (Davis.com).
FloLogic, Inc., The FloLogic Automatic Water Shutoff System unit info., Home page (www.flologic.com) downloaded Nov. 27, 2006 (copyright 2006) ... with FloLogic System 3.0 Printable Spec sheet.

(Continued)

*Primary Examiner*—Hezron Williams
*Assistant Examiner*—John Fitzgerald
(74) *Attorney, Agent, or Firm*—Stanley K. Hill; Christopher John Rudy

(57) ABSTRACT

A leak detection system capable of automatically detecting a leak in a pressurized piping system. A pressure decay test is utilized to test for leaks in the piping system. Disruption to users of the piping system is reduced by only performing the pressure decay test when there is no user demand on the piping system. Thus, a leakage test is performed by first determining whether there is user demand on the piping system and proceeding with a pressure decay test only if there is no user demand present. If user demand is initiated during the performance of a pressure decay test, the system detects the user demand and halts the pressure decay test until the user demand stops.

8 Claims, 2 Drawing Sheets

OTHER PUBLICATIONS

Give Systems, Inc., AQUA-STOP? water leak detection system, executive summary downloaded (www.building.org).

H2Control, Mitigator water control system, product info., home page . . . (www.themitigator.com) with "about" info., downloaded Nov. 27, 2006.

DynaQuip Controls, WaterCop automatic water shut-off systems, home page, product overview (how does it work? and where do I place sensors?), and FAQs (www.watercop.com) downloaded Nov. 27, 2006 copyright 2006.

* cited by examiner

LEAK DETECTION SYSTEM

FIELD OF THE INVENTION

The present invention generally relates to detecting leaks in pressurized piping systems used for conveying a liquid. A pressure decay test is performed during times when there is no user demand on the piping system, minimizing, if not precluding, disruption to users of the piping system.

BACKGROUND OF THE INVENTION

Leaks from water pipelines that can occur in a building, whether residential, commercial, or institutional, are highly undesirable. Over time, leaking water can be a significant and unnecessary expense. Moreover, water leakage from a broken or leaking water line can cause severe damage if left undetected for too long a period.

The prior art teaches numerous methods and devices for detecting a leak in a piping system and then automatically shutting off the supply to the piping system in order to minimize the waste and damage caused by the leak. However, heretofore the prior art approaches are generally insufficiently reliable, too complex, or too expensive to be effectively utilized in many applications. Accordingly, there is still a long felt need in the industry for improved approaches to detecting a leak in a piping system and then automatically shutting off the supply to the piping system in order to minimize damage caused by the leak.

SUMMARY OF THE INVENTION

The present invention provides for leak detection systems that are capable of automatically detecting a leak in a pressurized piping system. The present invention utilizes a pressure decay test to test for leaks in the piping system. Systems of the present invention also test for user demand on the piping system before initiating a pressure decay test in order to minimize or eliminate disruption to a user of the piping system. Thus, a leakage test is performed by first determining whether there is user demand on the piping system and proceeding with a pressure decay test only if there is no user demand present. If user demand is initiated during the performance of a pressure decay test, the system detects the user demand and halts the pressure decay test until the user demand stops.

DESCRIPTION OF THE DRAWINGS

The present invention is illustrated by way of example in the following drawings in which like references indicate similar elements. The following drawings disclose various embodiments of the present invention for purposes of illustration only. The drawings are not intended to limit the scope of the invention.

DETAILED DESCRIPTION OF PREFERRED EMBODIMENTS OF THE INVENTION

Figure 1:
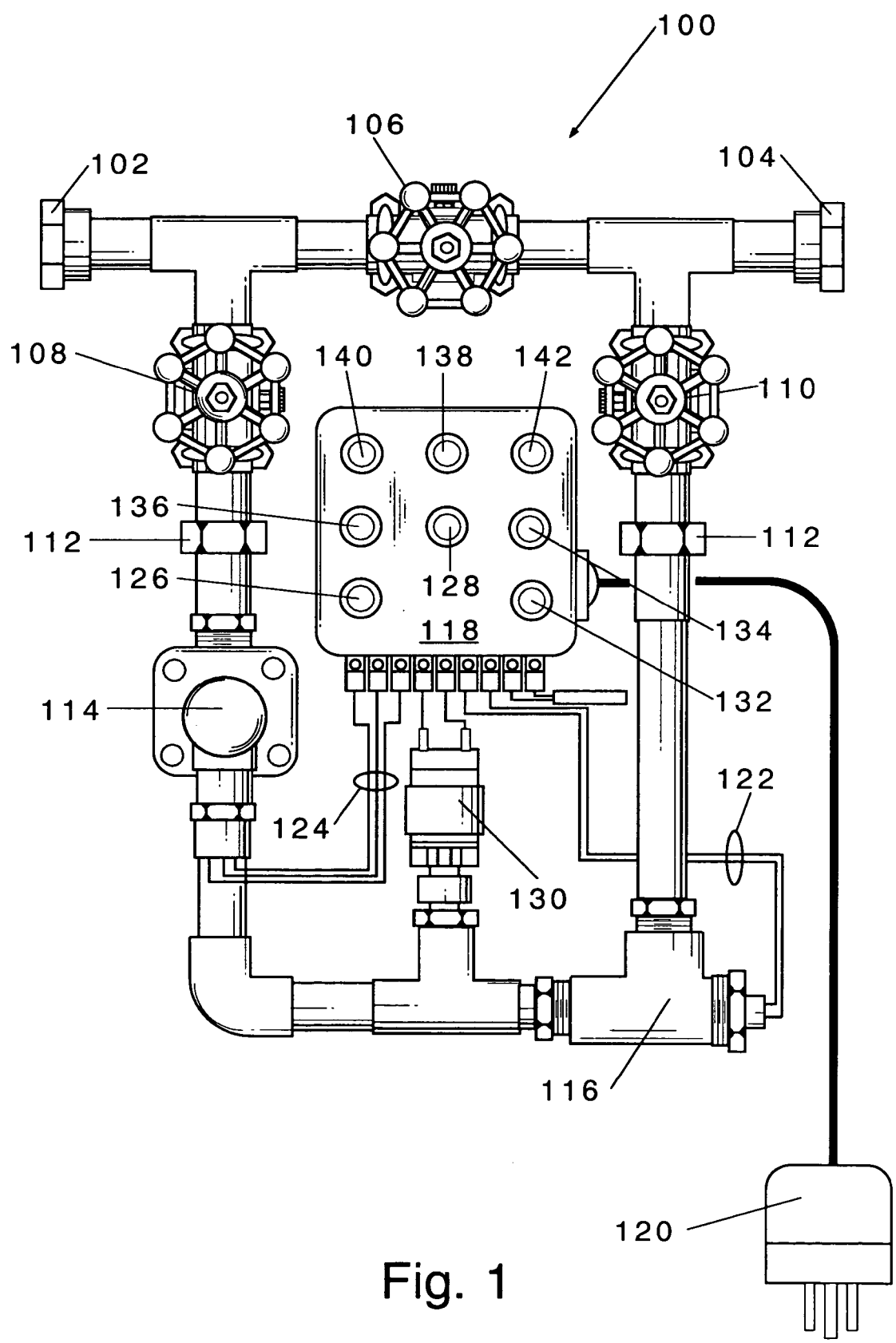
FIG. 1 illustrates an embodiment of a leak detection system according to the present invention.

In the following detailed description of preferred embodiments of the present invention, reference is made to the accompanying Drawings, which form a part hereof, and in which are shown by way of illustration specific embodiments in which the present invention may be practiced. It should be understood that other embodiments may be utilized and changes may be made without departing from the scope of the present invention. For example, the present specification primarily addresses the use of the present invention in conjunction with a water line such as would be found delivering potable water to a residential home, a commercial building, or an institutional building. However, one of ordinary skill in the art, after gaining an understanding of the present invention, will appreciate that the present invention can be advantageously utilized in conjunction with piping systems conveying liquids other than water, preferably non-compressible liquids.

The present invention utilizes a pressure decay test (also commonly referred to as a hydrostatic test) to test for leaks in a pressurized piping system, such as a common piping system supplying potable water from a residential water supply line to various outlets in the residence, such as appliances and faucets. Thus, a leakage test according to the present invention comprises a pressure decay test. The pressure decay test is performed by first shutting off the supply of liquid into the piping system to be tested and then monitoring the pressure in the piping system over time to determine whether there is pressure decay. If no pressure decay is detected, then it is determined that there is no leak present. Once the supply of liquid to the piping system is shut off, no appreciable pressure decay will be detected unless a volume of liquid is removed from the piping system. However, removing even a small amount of liquid from the piping system, such as would occur if a leak is present, will cause a significant pressure decay in the piping system. A volume of liquid can be removed from the piping system either by user demand or by a leak in the piping system. Accordingly, it is an important aspect of the present invention that detected pressure decay during periods of no user demand is indicative of a leak in the piping system.

Since a pressure decay test requires the supply to the piping test to be shut off during performance of the pressure decay test, the pressure decay test will disrupt normal use of the piping system if the pressure decay test is performed during periods when there is a user demand on the system. Therefore, the present invention applies the pressure decay test during times when there is no user demand on the piping system. In this manner, the pressure decay test does not disrupt the normal use of the piping system. Accordingly, when performing a leakage test on a piping system in accordance with the present invention, the piping system is first tested to see if there is any user demand. If there is user demand present then performance of the pressure decay test is delayed until a later time when no user demand is detected. When no user demand is detected, the pressure decay test is performed.

If, during the performance of a pressure decay test, no pressure decay is detected over a preset duration of time, the leak test is complete and the supply to the piping system is reopened as no leak has been detected. However, if pressure decay is detected during the performance of the pressure decay test, the pressure decay may be due to a leak in the piping system or it may be due to user demand initiated during the performance of the pressure decay test. Accordingly, upon detecting pressure decay during the pressure decay test period, the present system checks for user demand. If pressure decay has been detected and no user demand is present, then a leak has been detected. If user demand is present, the system preferably waits until no user demand is present and then restarts the pressure decay test. In preferred embodiments of the present invention, a signal is issued to users of the piping system whenever a leak has been detected. The signal may be any appropriate signal, such as an audible signal or the illuminating of a light.

Generally, leak detection systems according to the present invention comprise control logic, a user demand detector in communication with the control logic, a pressure decay detector in communication with the control logic, and a shut-off valve in communication with the control logic. Typically, the leak detection system is installed in the main supply to a piping system. For example, when used to detect a leak in a residential water piping system, the point of installation is typically just after any main water meter present or just after the point of entry into the residential building from a supply well pump.

The user demand detector may utilize any means useful for determining whether a user of a piping system is drawing liquid from the piping system (that is, a user demand is present). In preferred embodiments, the leak detection system checks for user demand by checking for liquid flow in the piping system. If the leak detection system is checking for user demand prior to the start of a leakage test, the shut-off valve is already open and the system checks for liquid flow to determine if user demand is present. If, however, the leak detection system is checking for user demand after pressure decay has been detected during a leakage test, the system first reopens the shut-off valve and then checks for liquid flow to determine if user demand is present. If detected pressure decay is due to a leak, the reopening of the shut-off valve will cause the pressure to increase and no appreciable flow will be detected. However, the presence of at least a minimum user flow rate after reopening the shut-off valve is an indication that a user demand is present. Because of potential fluctuations in the flow of liquid in the piping system, preferred embodiments of the present leak detection system may not determine that user demand is present unless a preset minimum liquid flow has been continuously detected for a brief period. For example, when used in residential water piping systems, leak detection systems have effectively determined user demand is present when a minimum flow is continuously detected for a period of about 0.5 seconds or more. In a typical residence, any user demand, such as turning on a water faucet, running a dishwasher, running a washing machine, or activating an ice maker, will cause water to flow through the main supply line at a rate greater than or equal to about 0.2 gallons per minute ("gpm"). Accordingly, in one embodiment the minimum user flow rate is set at about 0.2 gpm and a detected flow rate of greater than or equal to about 0.2 gpm is taken as an indication that user demand is present.

In one preferred embodiment, the user demand detector comprises a flow switch. Flow switches are known in industry and are typically preset to detect a minimum flow rate. During operation of a typical flow switch, a flow rate greater than or equal to the minimum flow rate (for example, 0.2 gpm) keeps a contact closed, allowing the flow switch to generate an electrical signal. On the other hand, if the flow rate drops below the minimum, then the contact opens, preventing the generation of the signal. This signal, indicating whether the contact is open or not, is communicated to the control logic. Typically, the communication is provided by an electrical connection (such as one or more wire connections) as is known in the electrical arts. However, the present invention contemplates that this signal could be communicated to the control logic utilizing wireless communication techniques. Wireless communications might be useful, for example, in a system that utilized one or more flow switches positioned at a distance from the control logic. For example, the present invention contemplates placing a flow switch near one or more points of user demand (for example, faucet, shower, etc.), which may be a significant distance from the control logic. Typically, the present invention utilizes a single flow switch positioned near the control logic and in communication with the control logic via an electrical connection.

In another embodiment, the user demand detector comprises a flow meter. Flow meters are known in industry. Unlike flow switches, a flow meter will measure the flow rate. This measured flow rate is then compared with the minimum flow rate (for example, 0.2 gpm) to determine if there is user demand. If the measured flow rate is less than the minimum, it is determined that no user demand exists. The measured flow rate can be communicated to the control logic and then compared to the minimum flow rate or the measured flow rate can be first compared to the minimum flow rate and the result (that is, whether user demand or not) can be communicated to the control logic. Similar to the use of a flow switch described above, the flow meter can be in communication with the control logic via an electrical connection or via wireless communication techniques.

The pressure decay detector may utilize any means useful for determining whether pressure decay is present. A determination as to whether pressure decay is present is made by shutting off the liquid supply to the piping system and measuring the pressure in the piping system over time to see if the pressure drops below a predetermined minimum acceptable pressure. A preferred pressure decay detector comprises a pressure switch. Pressure switches are known in industry. Typically, a pressure switch contains a contact that remains closed whenever the monitored pressure is greater to or equal to a predetermined minimum pressure. The closed contact allows the pressure switch to generate an electronic signal that can be communicated to the control logic. Similarly, whenever the pressure drops below the minimum pressure the contact opens. Accordingly, the control logic can monitor whether the contact is open or closed (that is, whether the pressure is below a minimum pressure or not). Alternately, a pressure decay detector may comprise a device that measures the pressure in the piping system and communicates the measured pressure to the control logic where the communicated pressure can be compared to a predetermined minimum acceptable pressure. Similar to the user demand detector, the pressure decay detector can be in communication with the control logic via an electrical connection or via wireless communication techniques.

The minimum acceptable pressure should be chosen such that the pressure in the piping system being monitored would rarely, if ever, drop below the minimum acceptable pressure absent liquid being withdrawn from the piping system either by user demand or by a leak. For example, the water pressure in a water piping system for a residence is typically from about 55 psig to about 100 psig. In one embodiment of the present invention, a minimum acceptable pressure of about 15 psig has been advantageously utilized. Although the water pressure in the piping system may vary from time to time or residence to residence, the water pressure will rarely, if ever, drop below about 15 psig.

The shut-off valve is used to shut off the liquid supply to the piping system. When the shut-off valve is closed, no liquid can flow into the piping system from the supply. During normal use of the piping system by a user, the shut-off valve is open. Shut-off valves useful in accordance with the present invention are known in industry and are sometimes referred to as electric solenoid valves. Preferred shut-off valves use electrical power to stay open and close if the power is shut off. Accordingly, preferred shut-off valves will automatically close, shutting off the supply of liquid to a piping system, if there is a power failure to the electrical power supply. The shut-off valve is in communication with the control logic. Similar to the user demand detector and the pressure decay detector, the shut-off valve can be in communication with the control logic via an electrical connection or via wireless communication techniques. The communication between the control logic and the shut-off valve allows the control logic to control the shut-off valve by opening and closing it at appropriate times.

The control logic comprises electronic circuitry useful for initiating leakage tests, determining whether a leak is present, and shutting off the shut-off valve when the control logic has determined a leak is present. The control logic may be implemented utilizing a programmable logic controller ("PLC") as is known in the electronic arts or by other means, such as a printed circuit board, for example. Upon gaining an understanding of the teachings of the present specification, one or ordinary skill in the electronic arts should be able to implement the control logic according to the present invention without undue experimentation.

The control logic periodically initiates a leakage test. For a water piping system in a residence, the leakage test typically is initiated every few hours. The time between initiated leakage tests may be referred to herein as the leakage test frequency. The control logic contains a clock or timing circuitry to keep track of the amount of elapsed time between leakage tests. Such clock or timing circuitry is general known in the electronic arts and may be referred to herein as the leakage test frequency timer. When the clock indicates that the time elapsed since the last leakage test is equal to or greater than the leakage test frequency, the control logic initiates another leakage test.

When a leakage test is initiated, the control logic first utilizes the user demand detector to determine whether user demand is present. In preferred embodiments, the control logic provides an indication to the user of the leak detection system whenever a user demand test is being performed. In one embodiment, this indication is provided by lighting an LED on a front panel of the leak detector system. For example, if the user demand detector comprises a flow switch or a flow meter as described above, the control logic determines whether the flow rate is less than a preset minimum user flow rate. If so, then no user demand is present. On the other hand, if the flow rate is greater than or equal to the minimum user flow rate (that is, user demand is present), then the leakage test is stopped. The control logic can then wait until the flow rate drops below the minimum user flow rate, upon which time the leakage test is restarted. In preferred embodiments, the control logic waits until either the flow rate drops below the minimum user flow rate or a preset maximum allowable demand time has been exceeded. In the case where the flow rate drops below the minimum user flow rate, the leakage test is restarted. In the case where the maximum allowable demand time has been exceeded, the shut-off valve is closed.

When a leakage test is initiated and no user demand is present, the control logic initiates a pressure decay test. Upon initiating a pressure decay test, the control logic communicates a signal to the shut-off valve to close, isolating the main supply to the piping system. This signal may comprise simply shutting off the power to an electrical solenoid valve, causing it to close. In preferred embodiments, the control logic also provides an indication to the user whenever a pressure decay test is being performed. In one embodiment, this indication is provided by lighting an LED on a front panel of the leak detector system. Once the shut-off valve is closed, the control logic begins monitoring the pressure in the piping system and continues monitoring the pressure for a predetermined amount of time. This predetermined amount of time may be referred to herein as the pressure decay test time or pressure decay test duration. In preferred embodiments, the pressure decay test time can be set by a user of the leak detection system. For typical residence water piping systems a pressure decay test time of about 30 seconds has been used effectively. If the monitored pressure does not drop below a minimum acceptable pressure and the pressure decay test time has elapsed, then it is determined that no leak is present. The control logic then reopens the shut-off valve and again utilizes the leakage test frequency timer to determine when the next leakage test should be initialized.

If the monitored pressure drops below a minimum acceptable pressure before the pressure decay test time has elapsed, then liquid has been removed from the piping system and the control logic determines whether the liquid was removed via a leak or via user demand (user opening a faucet, turning on an appliance, etc.). The control logic tests for user demand by first reopening the shut-off valve, which was closed to initiate the pressure decay test, and then utilizing the user demand detector as described above. If no user demand is present, it is determined that the removal of liquid from the piping system is due to a leak in the piping system. Once it is determined a leak is present, the control logic closes the shut-off valve, and it remains closed until the leak detection system is reset. Preferably, a warning signal is issued, indicating a leak has been detected. Typically, a user of the leak detection system will find and fix the leak and then reset the leak detection system. When the leak detection system is reset, the shut-off valve is opened and the leakage test frequency timer is restarted. On the other hand, if user demand is present, then the leakage test is stopped. The control logic can then wait until no user demand is present, upon which time the leakage test is restarted. In preferred embodiments, the control logic waits until either the user demand stops or a preset maximum allowable demand time has been exceeded. In the case where the user demand stops, the leakage test is restarted. In the case where the maximum allowable demand time has been exceeded, the shut-off valve can be closed in the same manner as when a leak is detected.

EXAMPLES

FIG. 1 shows an embodiment of a leak detection system 100 according to the present invention. The leak detection system 100 can be advantageously installed in a residence to detect and limit damage from leaks in the residence's water piping system. The leak detection system 100 is attached to the main water supply to the residence by a first piping joint 102 and is attached to the residence's piping system by a second piping joint 104. The leak detection system 100 comprises three valves that are manually opened and closed. During normal operation of the leak detection system 100, the first valve 106 is closed and the second valve 108 and third valve 110 are open. Thus, water enters the leak detection system 100 through the first piping joint 102, flows through the first valve 108, flows through the second valve 110, and exits the leak detection system 100 through the second piping joint 104. However, a user of the leak detection system 100 can put the leak detection system 100 into a by-pass mode by closing the second valve 108 and the third valve 110 and opening the first valve 106. The leak detection system 100 may be put into by-pass mode, for example, to facilitate maintenance or repairs. In by-pass mode, water flows straight through from the first piping joint 102 to the second piping joint 104 and does not flow through the second valve 108 or the third valve 110. Accordingly, when the leak detection system 100 is in by-pass mode, the disconnect unions 112 can be loosened and the bottom portion of the leak detection system 100 can be removed, making maintenance, repair, or replacement easier. During normal use of the leak detection system 100 (that is, when it is not in by-pass mode) and there is user demand, water will flow through the second valve 108, through the shut-off valve 114, through the flow switch 116 and through the third valve 110.

The flow switch 116 is used to determine whether user demand is present. The flow switch 116 is preset to detect a minimal water flow rate (for example, 0.2 gpm). Flow switches, such as the flow switch 116 in the leak detection system 100 of FIG. 1, are commercially available. The flow switch 116 is in communication with the control logic in the control box 118 via electrical wires 122. Whenever there is user demand, the control logic keeps track of how long the user demand is present. If the period of user demand exceeds a user determined maximum user demand time, the control logic communicates a signal to the shut-off valve 114 to close, stopping water flow through the leak detection system 100, and therefore, stopping water flow to the piping system. The control logic is in communication with the shut-off valve 114 via the electrical wiring 124. Whenever the maximum user demand time is exceeded, the control logic in the leak detection system 100 will also cause a system fault indicator 128 to light, indicating to a user why the leak detection system 100 was shut down. A user of the leak detection system 100 can set the maximum user demand time from 1 minute to 99 minutes by adjusting the demand set dial 126. Once the leak detection system 100 has been shut down, a user of the leak detection system 100 can reset the leak detection system 100 by depressing the system reset button 136. Resetting the leak detection system 100 opens the shut-off valve 114 and resets the leakage test frequency timer.

The control box 118 houses the control logic of the leak detection system 100. The control box 118 also comprises a power on indicator 138, a demand testing indicator 140, and a leak testing indicator 142. The power on indicator 138 is typically a light source, such as an LED, and is illuminated whenever there is electrical power supplied to the system. The demand testing indicator 140 is typically a light source, such as an LED, and is illuminated whenever a user test demand is being performed. The leak testing indicator 142 is typically a light source, such as an LED, and is illuminated whenever a pressure decay test is being performed. The leak detection system 100 is powered by plugging the power cord 120 into a standard 120-volt outlet.

The control logic initiates a leakage test according to a preset leakage test frequency. For use with residential water piping systems, the leakage test frequency is set such that a leakage test is performed every few hours. When it is time to perform a leakage test, the control logic checks the flow switch 116 for user demand. If the flow switch 116 detects user demand the start of the leakage test is delayed until there is no user demand present. If the flow switch 116 does not detect user demand, then a leakage test is initiated. The control logic initiates the leakage test by first closing the shut-off valve 114, stopping water from flowing through the leak detection system 100 and into the piping system. The control logic then begins to monitor the pressure switch 130.

The pressure switch 130 is monitored for a preset amount of time, which is referred to herein as the pressure decay test time. A user of the leak detection system 100 can set the pressure decay test time from 1 second to 99 seconds by adjusting the test set dial 132. For residential water piping systems, a pressure decay test time setting of about 30 seconds can be advantageously utilized. The pressure switch 130 detects if the pressure in the piping system drops below a predetermined minimal acceptable pressure. For residential water piping systems a minimal acceptable pressure of 15 psig can be advantageously utilized. Pressure switches, such as the pressure switch 130 in the leak detection system 100 of FIG. 1, are commercially available.

If the pressure switch 130 detects that the pressure has dropped below the minimal acceptable pressure, then the control logic initiates a test to determine if there is user demand. Although presence of user demand is determined before the leakage test is initiated, this test for user demand is performed because a user may create user demand (by turning on a faucet, for example) during the period between initiating a leakage test and determining that the pressure has decreased below the minimal acceptable pressure. The control logic performs this test for user demand by first opening the shut-off valve 114 and then checking the flow switch 116 to determine if the minimum user flow rate has been detected by the flow switch 116. In some applications, fluctuations in flow rate may exist for a brief period after reopening the shut-off valve 114. The control logic may account for these fluctuations in flow rate by delaying for a short time (for example, about 0.5 seconds) before checking the flow switch 116 for user demand. Alternately, the control logic may check that the flow switch 116 has detected a minimal user flow rate continuously for a short period (for example, at least about 0.5 seconds) before determining that user demand is present.

If the test for user demand performed during a leakage test shows that no user demand is present, then there is a leak in the piping system and the control logic sends a signal to the shut-off valve 114 to close, stopping water flow through the leak detection system 100, and therefore, stopping water flow to the piping system. Whenever a leak has been detected, the control logic in the leak detection system 100 will also cause a leak detected indicator 134 to light, indicating to a user why the leak detection system 100 was shut down. While the leak detection system 100 is shut down, a user can find and repair the detected leak. A user of the leak detection system 100 can reset the leak detection system 100 by depressing the system reset button 136. On the other hand, if the test for user demand performed during a leakage test shows that there is user demand present, the control logic keeps the shut-off valve 114 open and waits until no user demand is detected, at which time the leakage test is restarted.

Figure 2:
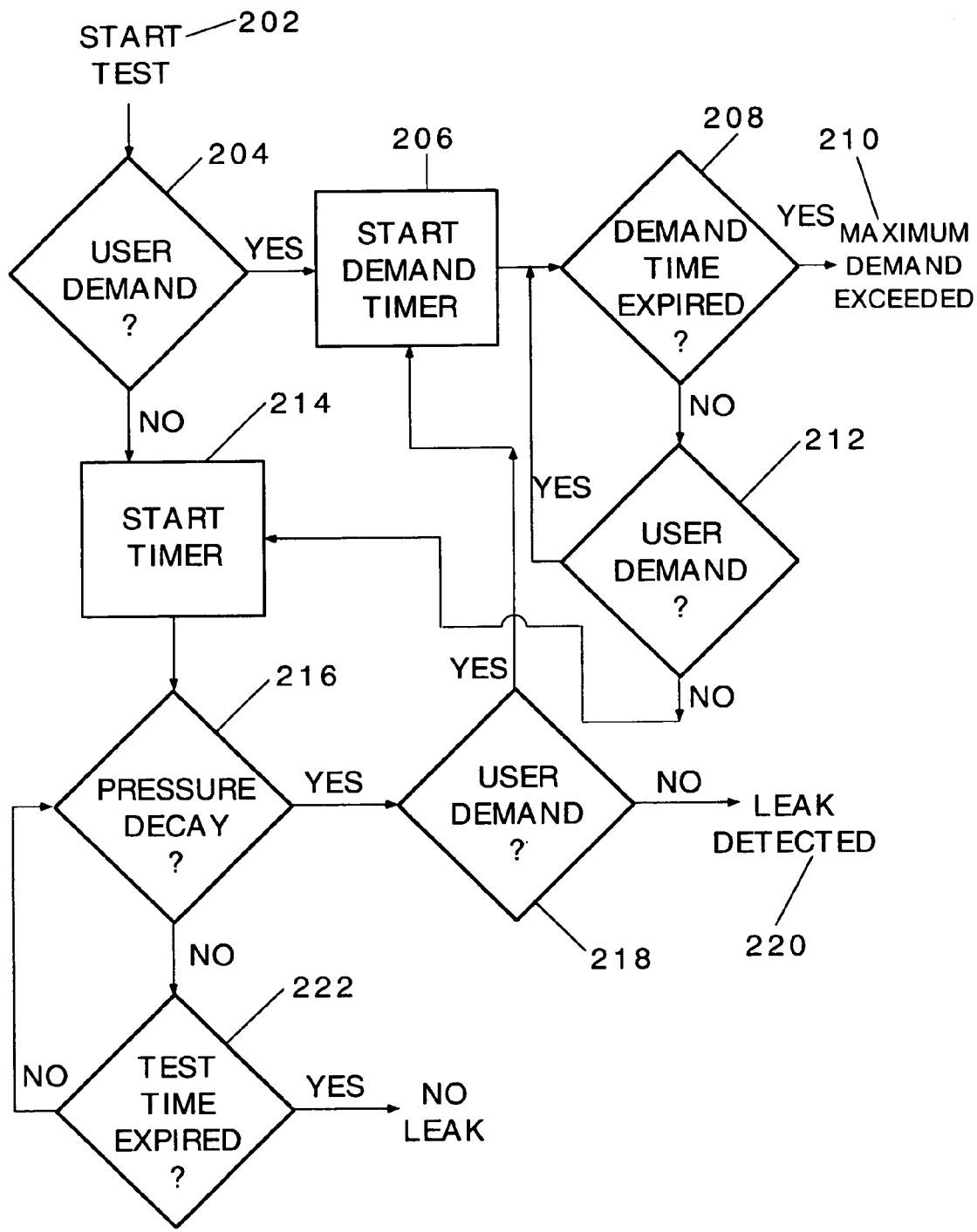
FIG. 2 shows a flowchart that illustrates an example method of the present invention.

FIG. 2 shows a flowchart that illustrates an example method 200 of the present invention. The method 200 is one example of a method that can be used to implement a leakage test according to the present invention. It should be noted that the method 200 is just one example of a method that can be utilized in producing leak detection systems of the present invention. Upon attaining an understanding of the present specification, one of ordinary skill in the electrical arts will be able to produce control logic (that is, circuitry and other electronic components) capable of implementing methods of the present invention. The system utilizes a leakage test frequency timer to determine when to start a leakage test 202. Upon starting the leakage test 202, the system determines whether user demand is present 204.

If user demand is present, a demand timer is started 206. The demand timer keeps track of how long user demand is present. The current demand time is compared to the maximum user demand time 208. If the maximum user demand time is exceeded 210 the system can be shut down by closing the shut-off valve, shutting off the liquid supply to the system. If the maximum user demand time is not exceeded the system determines whether user demand is present 212. If no user demand is present, the system starts the leakage test timer 214. If user demand is present, the system continues to determine whether the maximum demand time has been exceeded 208 and whether user demand is present 212 until either the maximum demand time is exceeded 210 or there is no longer user demand.

When there is no user demand present or any detected user demand has stopped, a pressure decay test is started by first starting a pressure decay test timer 214. The system then checks for pressure decay 216 in the piping system. If pressure decay is detected, the system checks for the presence of user demand 218. If no user demand is present, then a leak has been detected 220 and the system can be shut down. If user demand is present, the pressure decay test is halted, the user demand timer is started 206, and the system proceeds as described above until either no user demand is present or the maximum user demand time has been exceeded 210. If no pressure decay has been detected, the system checks to determine if the pressure decay test time has expired 222. If the pressure decay test time has expired, then the pressure decay test is complete and no leak has been found. However, if the pressure decay test time has not expired, then the system continues checking for pressure decay 216 and checking to determine if the pressure decay test time has expired 222 until either pressure decay has been detected or the pressure decay test time has expired.

The present specification describes a leak detection system capable of automatically detecting a leak in a pressurized piping system. The present invention utilizes a pressure decay test to check for leaks in the piping system. The present invention utilizes a user demand test to reduce disruption to users of the piping system by only performing the pressure decay test when no user demand is present. While the present invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and by equivalents thereto.

What is claimed is:

1. A system useful for detecting a leak in a pressurized piping system having a main supply line and a plurality of branch fluid supply lines in communication with the main supply line, said system comprising:
   control logic;
   one and only one user demand detector selected from the group consisting of a flow switch and a flow meter, the user demand detector capable of determining whether user demand is present in the pressurized piping system, and the user demand detector being in communication with the control logic; one and only one single pressure decay detector in communication with the control logic; and a shutoff valve in communication with the control logic.

2. A system according to claim 1, wherein the control logic is designed to close the shut-off valve whenever pressure decay has been detected and no user demand has been detected.

3. A system according to claim 1, wherein the user demand detector consists essentially of the flow switch.

4. A system according to claim 1, wherein the user demand detector consists essentially of the flow meter.

5. A system according to claim 1, wherein the pressure decay detector comprises a pressure switch.

6. A system according to claim 1, wherein the user demand detector and the pressure decay detector are in close proximity to the control logic.

7. A system according to claim 1, wherein the user demand detector, the pressure decay detector, and the shutoff valve are positioned in a normal operation line between a fluid entry valve and a fluid exit valve, and there is a by-pass valve in a by-pass line between the fluid entry valve and the fluid exit valve.

8. A system according to claim 7, wherein the user demand detector and the pressure decay detector are in close proximity to the control logic.

* * * * *